(12) United States Patent
Whitney et al.

(10) Patent No.: US 11,859,671 B2
(45) Date of Patent: Jan. 2, 2024

(54) HIGH TORQUE FRICTION FIT LOW MOMENT HUB JOINT ASSEMBLY FOR A SHAFT

(71) Applicant: Riverhawk Company, New Hartford, NY (US)

(72) Inventors: Robert M. Whitney, Whitesboro, NY (US); Daniel M. Lauzon, Camillus, NY (US)

(73) Assignee: Riverhawk Company, New Hartford, NY (US)

( * ) Notice: Subject to any disclaimer, the term of this patent is extended or adjusted under 35 U.S.C. 154(b) by 46 days.

(21) Appl. No.: 17/533,724

(22) Filed: Nov. 23, 2021

(65) Prior Publication Data
US 2022/0080538 A1    Mar. 17, 2022

Related U.S. Application Data (62) Division of application No. 16/394,156, filed on Apr. 25, 2019, now Pat. No. 11,358,243.
(Continued)

(51) Int. Cl.
*F16D 1/092* (2006.01)
*B23P 19/027* (2006.01)
*F16D 1/09* (2006.01)

(52) U.S. Cl.
CPC ............ *F16D 1/092* (2013.01); *B23P 19/027* (2013.01); *F16D 2001/0906* (2013.01)

(58) Field of Classification Search
CPC .......... B23P 19/027; F16D 1/09; F16D 1/091; F16D 1/092; F16D 2001/0906;
(Continued)

(56) References Cited

U.S. PATENT DOCUMENTS

| 3,358,772 A | 12/1967 | Thomas |
| 3,596,943 A | 8/1971 | Krauss |

(Continued)

FOREIGN PATENT DOCUMENTS

| DE | 1932851 A1 * | 1/1970 | ............. F16D 1/091 |
| DE | 2532824 A1 * | 2/1976 | ..... F16D 2001/0906 |

(Continued)

OTHER PUBLICATIONS

"Phosphate Coating & Phosphating." Metal Coatings Corp. Mar. 2, 2017, [online], [retrieved on Apr. 4, 2023] Retrieved from the Internet <URL: https://web.archive.org/web/20170203041224/https://www.metcoat.com/phosphate-coatings.htm>. (Year: 2017).*

*Primary Examiner* — Josh Skroupa
(74) *Attorney, Agent, or Firm* — Woods Oviatt Gilman LLP; Dennis B. Danella, Esq.

(57) ABSTRACT

A hub joint assembly for frictionally connecting a shaft to a connector includes a coupling hub including a collar portion and a flange portion. The collar portion includes a bore having an inner surface that is configured to be positioned adjacent to the outer surface of the shaft. The collar portion further includes an outer surface that may be conical. The flange portion extends from the collar portion and is configured to be coupled with the connector. The hub joint assembly further includes a clamp ring including a bore having an inner surface. The inner surface may be conical and configured to mate with the outer surface of the coupling hub. A passage is defined in the clamp ring and extends from an outer surface of the clamp ring to the inner surface of the clamp ring.

22 Claims, 7 Drawing Sheets

Related U.S. Application Data

(60) Provisional application No. 62/662,479, filed on Apr. 25, 2018.

(58) Field of Classification Search
 CPC ....... F16D 2250/0061; Y10T 403/1633; Y10T 403/22; Y10T 403/25; Y10T 403/253; Y10T 403/255; Y10T 403/7062; Y10T 403/7064
 USPC ............... 403/15, 31, 34, 36, 37, 373, 374.1
 See application file for complete search history.

(56) References Cited

U.S. PATENT DOCUMENTS

| | | | |
|---|---|---|---|
| 3,865,497 A * | 2/1975 | Bratt | F16D 1/091 403/15 |
| 4,268,185 A | 5/1981 | Ralph | |
| 4,396,310 A | 8/1983 | Ralph | |
| 4,471,846 A | 9/1984 | Mullenberg | |
| 4,702,637 A | 10/1987 | Muellenberg | |
| 4,884,916 A * | 12/1989 | Johnson, III | F16D 1/097 403/370 |
| 5,149,220 A * | 9/1992 | Elsner | F16D 1/091 403/15 |
| 5,476,337 A | 12/1995 | Mullenberg | |
| 5,639,176 A | 6/1997 | Mullenberg | |
| 6,056,473 A | 5/2000 | Erhard | |
| 6,390,723 B1 | 5/2002 | Erhard | |
| 7,156,575 B2 | 1/2007 | Weiss et al. | |
| 7,837,406 B2 | 11/2010 | Wilhelm | |
| 8,230,986 B2 * | 7/2012 | Ootsuka | F16D 25/046 192/56.3 |
| 9,670,968 B1 * | 6/2017 | Holley, Jr. | F16D 1/092 |
| 2008/0267692 A1 * | 10/2008 | Soderlund | F16D 1/091 403/5 |
| 2010/0230228 A1 * | 9/2010 | Wernecke | F16D 1/091 192/85.01 |
| 2010/0239365 A1 * | 9/2010 | Wernecke | F16D 1/091 403/267 |

FOREIGN PATENT DOCUMENTS

| | | | | |
|---|---|---|---|---|
| DE | 4326150 A1 * | 11/1994 | ............ | F16D 1/095 |
| DE | 9308717 U1 * | 12/1994 | ............ | F16D 1/095 |
| DE | 19512363 A1 | 10/1996 | | |

\* cited by examiner

HIGH TORQUE FRICTION FIT LOW MOMENT HUB JOINT ASSEMBLY FOR A SHAFT

CROSS-REFERENCE TO RELATED APPLICATIONS

This application is a divisional of U.S. patent application Ser. No. 16/394,156, filed on Apr. 25, 2019, which claims the benefit of U.S. Patent Application No. 62/662,479, filed on Apr. 25, 2018, the contents of which are incorporated by reference in their entirety.

FIELD OF THE INVENTION

The present invention generally relates to a hub joint assembly for a shaft; more particularly, to a low moment hub joint assembly that provides a high torque friction fit connection between a coupling hub and a shaft of a machine that increases an interference limit there between and reduces damage to the shaft during assembly thereby improving capacity and service reliability of the hub joint assembly relative to existing solutions.

BACKGROUND OF THE INVENTION

Machines are used in a wide variety of industries to increase production levels and handle tasks that may not be easily attainable using man power. One industry that utilizes machinery to accomplish certain tasks is the petrochemical industry for petrochemical production. The demands in this field, as well as other fields, utilize turbomachinery such as high speed pumps, compressors, gears, turbines, and motors that use high speed rotating shafts during operation. It is desirable that these machines are designed for maximum power density and long term operational reliability. One consequence of configuring turbomachinery for both power and reliability is that the resulting machines tend to be sensitive to dynamic excitation, particularly lateral vibration. As such, there is a need to optimize the lateral mass-elastic properties of the rotating shaft in the turbomachinery in order to avoid possible excitations that may occur during service. Oftentimes mass-elastic design takes precedence over power density design goals leaving the designer to sacrifice some power density in the resulting turbomachinery design. There is a need to provide more power capability than the current state of the art allows.

In certain instances it is necessary to connect the rotating shafts of two turbomachines so they can work together to accomplish a specified task. The connection between the two shafts may be made using a low moment coupling (FIG. 1) with high pressure friction connections. The low moment coupling may include one hub placed on the end of one shaft, another hub placed on the other shaft, and one or more connectors that extend between and couple to the two hubs together. Further, each hub may be engaged with its respective shaft using a hydraulic interference fit with a practical limit of 0.002-0.003 inch/(inch of outer diameter of hub). This limit is usually dictated by a tendency for interface surfaces of the hub and shaft to adhere during assembly and/or disassembly leading to stuck parts and surface damage. Repairing damage to the shaft and/or hub in the field is expensive and time consuming. To avoid such damage, designers have a tendency to limit interference which in turn sacrifices machine capacity and usefulness.

As such, there is a need for increasing the interference limit between a hub and shaft connection and eliminating shaft damage at assembly thereby saving time and improving both capacity and service reliability of a respective low moment coupling. The present invention fulfills these and other needs.

SUMMARY OF THE INVENTION

In order to overcome the above stated problems, the present invention provides a hub joint assembly for a low moment coupling that is used to frictionally connect a shaft of a machine to a connector to transfer rotational movement of the shaft to an associated shaft. The hub joint comprises a coupling hub and a clamp ring. The coupling hub includes a collar portion and a flange portion, wherein the collar portion includes a bore having an inner surface that is configured to be positioned adjacent to an outer surface of the shaft, and an outer surface that may be conically-shaped. The flange portion extends from the collar portion and is configured to be coupled with the connector. The flange portion may extend perpendicularly from the collar portion and be fixedly coupled with the connector. The clamp ring includes a bore having an inner surface and an outer surface. The inner surface of the clamp ring may be conically-shaped and configured to mate with the outer surface of the coupling hub to form an interface. A passage is defined in the clamp ring and extends from the outer surface of the clamp ring to the inner surface of the clamp ring. The outer surface of the clamp ring may be configured to be positioned within a bore defined in the connector.

In another aspect, the hub joint assembly may include an anti-adhesion coating disposed on the inner surface of the clamp ring. Further, at least one of the inner surface of the clamp ring or the outer surface of the coupling hub may have one or more distribution grooves formed therein to facilitate the distribution of hydraulic fluid introduced through the passage and at the interface between the inner surface of the clamp ring and the outer surface of the coupling hub.

In another aspect, a method of coupling a shaft to a connector using a hub joint assembly is provided. The shaft includes an outer surface and a longitudinal axis, and the hub joint assembly includes a coupling hub and a clamp ring. The coupling hub includes a collar portion and a flange portion, wherein the collar portion includes a bore having an inner surface, and an outer surface that may be conically-shaped. The flange portion extends from the collar portion. The clamp ring includes a bore having a conically-shaped inner surface and an outer surface. A passage is defined in the clamp ring and extends from the outer surface of the clamp ring to the inner surface of the clamp ring. The method comprises: a) positioning coupling hub on the shaft so that the inner surface of the collar portion is positioned adjacent to the outer surface of the shaft to provide a final axial position; b) sliding the clamp ring on the coupling hub so that the conical inner surface of the clamp ring is positioned adjacent to the conical outer surface of the coupling hub at a first relative position to establish a zero interference point; c) providing a pusher device including a cylinder having a bore defined therein, and a piston slidably positioned within the bore, wherein a pressure chamber is defined between the cylinder and the piston, wherein the cylinder is coupled with the clamp ring, wherein the piston is coupled with at least one of the shaft and the coupling hub; d) providing a dilation pressure assembly including a passage defined therein, wherein the dilation pressure assembly is associated with the clamp ring so that the passage of the dilation pressure assembly is aligned with the passage defined in the clamp ring; e) introducing hydraulic fluid through the passage of the dilation pressure assembly and the passage defined in the clamp ring so that the hydraulic fluid is positioned at an interface between the conical inner surface of the clamp ring is positioned adjacent to the conical outer surface of the coupling hub; f) introducing hydraulic fluid into the pressure chamber of the pusher device to move the cylinder relative to the piston and thereby move the clamp ring relative to the coupling hub to a second relative position, wherein the movement of the clamp ring relative to the coupling hub imposes an interference pressure between the coupling hub and the shaft thereby frictionally coupling the coupling hub to the shaft; g) measuring or otherwise identifying a distance between the first relative position and the second relative position, wherein the measured distance is indicative of an interference pressure between the coupling hub and the shaft; and h) repeating steps e), f) and g) until the identified distance is associated with a predetermined interference pressure to frictionally couple the coupling hub to the shaft, wherein the identified distance increases each time steps e), f) and g) are repeated.

The present invention includes further features and advantages which will be described in more detail below.

BRIEF DESCRIPTION OF THE DRAWINGS

The above-mentioned and other features and advantages of this invention, and the manner of attaining them, will become apparent and be better understood by reference to the following description of the invention in conjunction with the accompanying drawings, wherein.

BRIEF DESCRIPTION OF THE INVENTION

Figure 1:
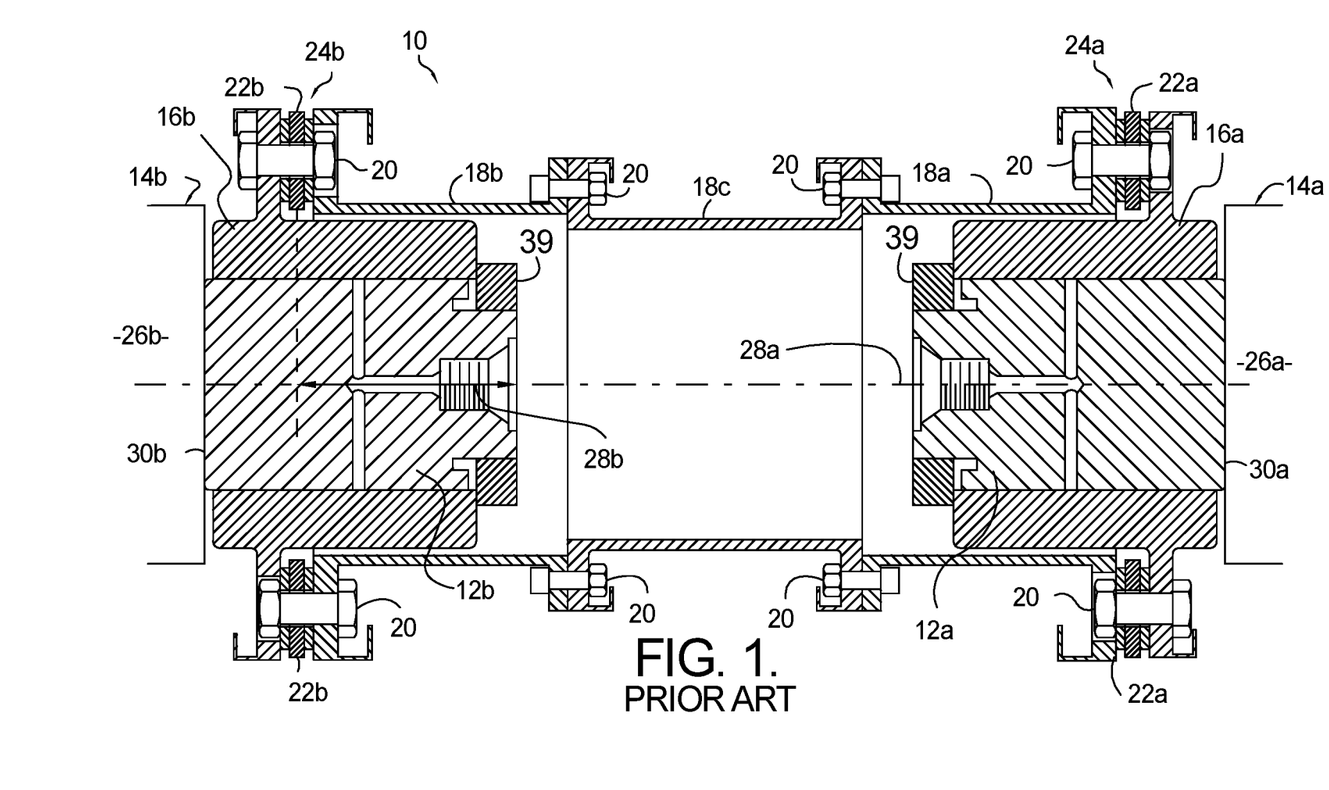
FIG. 1 is a cross-sectional view of a prior art low moment coupling including a pair of hubs connected together using a plurality of connectors.
Figure 2:
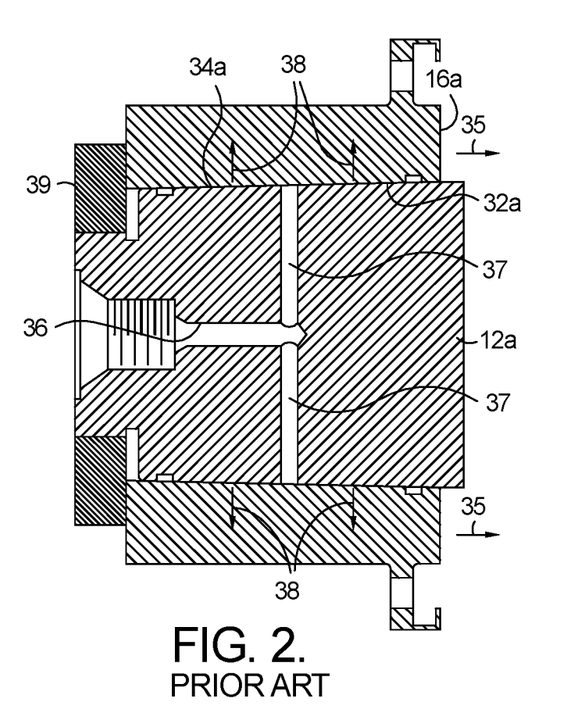
FIG. 2 is a cross-sectional view of one of the hubs shown in FIG. 1 along with an associated shaft.

With reference to FIGS. 1 and 2, an exemplary prior art low moment coupling 10 will initially be described so that the aspects of the present invention can be highlighted. In operation, coupling 10 may use high pressure friction connections to connect two shafts 12a, 12b of respective mating machines 14a, 14b to transfer rotational movement of one shaft to the other shaft. Opposite ends of coupling 10 include a hub 16a, 16b that are connected with shafts 12a, 12b, respectively, in a manner that will be described in further detail below. Coupling 10 further includes one or more connectors 18a, 18b, 18c that operate to connect hubs 16a, 16b together using fasteners 20. Further, a flex element 22a, 22b is positioned between respective connectors 18a, 18c and hubs 16a, 16b to allow for misalignment and flexibility between these components.

Coupling 10 is referred to as a low moment coupling because it includes a design that places a suspension point 24a, 24b of the respective connector 18a, 18b mass as close to the machinery casing 26a, 26b as possible, with the objective of reducing the inertial moment that the machinery shaft must support. This is done by positioning an articulation center 28a, 28b of the respective flex element 22a, 22b toward an inboard end 30a, 30b of the respective hub 16, 16b as much as possible.

One way to couple hub 16a, 16b with its respective shaft 12a, 12b is through a hydraulic interference fit, which provides a good combination of strength, low weight, inherent balance and low stress concentration. In order to implement such a fit, as seen in FIG. 2, for example, the shape of an inner surface 32a of hub 16a and an outer surface 34a of shaft 12a are usually conical. With a conical fit, an axial position of hub 16a on shaft 12a relative to the free-state contact position of these components determines an interference level. To make up such a fit, an assembler must apply a high axial force to drive hub 16a up shaft 12a in a direction 35. When sliding hub 16a on shaft 12a, hydraulic fluid is introduced through passages 36, 37 defined in shaft 12a that direct the hydraulic fluid to the interface between inner surface 32a of hub 16a and outer surface 34a of shaft 12a. The addition of hydraulic pressure in the gap at the interface between hub 16a and shaft 12a applies a radial force in a direction 38 that can "float" the hub 16a, which reduces friction, installation force and provides for the "hydraulic fit." The hydraulic pressure is then released and a back-up retainer nut 39 is disposed on an end of shaft 12. The contact surfaces of inner surface 32a of hub 16a and outer surface 34a of shaft 12a are dimensioned to fit together with a high pressure interference, in the neighborhood of 0.002-0.003 inch/(inch of outer diameter of shaft). The outer diameter of hub 16a may be around 1.25 to 1.75 times the diameter of shaft 12a yielding contact pressures of 12,000 to 20,000 psi. This tight fit rigidly binds hub 16a and shaft 12a together under normal loading. However, the current state of hydraulic fit technology has a practical interference limit of around 0.003 inch/(inch of outer diameter of hub). This limit is usually dictated by a tendency for the interface surfaces of hub 16a and shaft 12a to adhere during assembly and/or disassembly leading to stuck parts and surface damage. Repairing damage in the field is expensive and time consuming, particularly damage to a shaft given the high cost of shafts. To avoid damage, designers limit interference, which in turn sacrifices machine capacity and usefulness.

Figure 3:
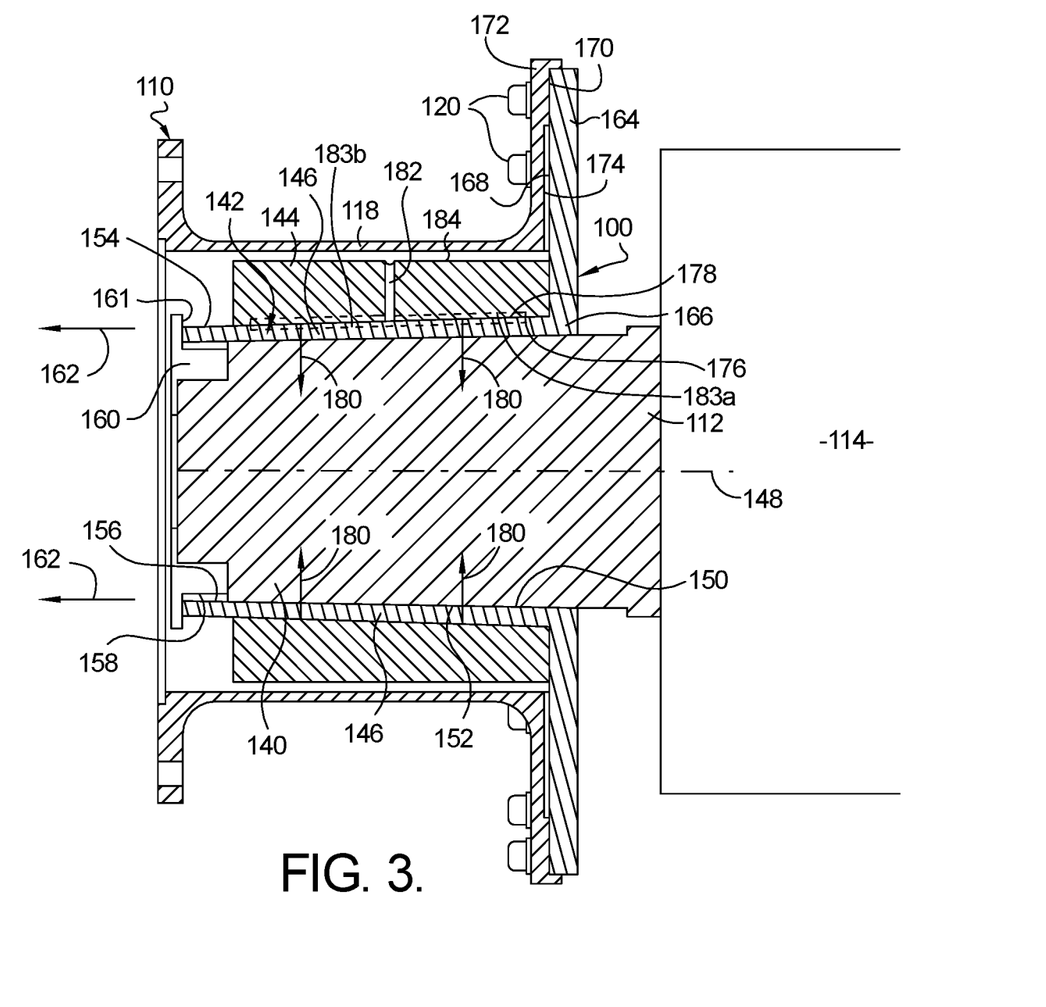
FIG. 3 is a cross-sectional view showing a hub joint in accordance with an aspect of the present invention.

Referring now to FIG. 3, there is shown one exemplary embodiment of a hub joint assembly 100 in accordance with the present invention. In general, hub joint 100 may form a part of a low moment coupling 110 that uses high pressure friction to connect to a shaft 112 of a machine 114. As will be seen through the description set forth below, hub joint assembly 100 operates to increase an interference limit between hub joint assembly 100 and shaft 112, and eliminates shaft damage during assembly by eliminating high pressure sliding upon the outer diameter of the shaft, thereby improving both capacity and service reliability. While FIG. 3 only shows one hub joint assembly 100 connected to shaft 112, it should be understood that one or more additional hub joint assemblies may be included in low moment coupling 110 to allow shaft 112 of machine 114 to be mated with the shaft of another machine. Any description set forth herein with respect to hub joint assembly 100 may also apply to additional hub joint assemblies included in low moment coupling 110.

As best seen in FIG. 3, a low moment coupling 110 may include hub joint assembly 100 and at least one connector 118. Connector 118 may directly connect hub joint assembly 100 to another hub joint assembly (not shown) to connect shaft 112 to the shaft of a mating machine. Connector 118 may also be used in conjunction with one or more additional connectors to connect hub joint assembly 100 to another hub joint assembly. Hub joint assembly 100 may be fixedly coupled to connector 118 using one or more fasteners 120, and frictionally connected to shaft 112 as will be described in detail below. Hub joint assembly 100 is adapted to engage a distal end 140 of shaft 112 having any number of different configurations. For example, FIG. 3 shows a distal end 140 that is cylindrically-shaped. In another example, distal end 140 may include a conical shaped end with features that accommodate a traditional hydraulic fit, such as the passages 36, 37 shown in FIG. 2, even though such features may not be utilized, thus illustrating that hub joint assembly 100 may be retrofitted to an existing shaft end. In another examples, distal end 140 of shaft 112 may be straight-stepped with hydraulic features, straight keyed, taper keyed, polygonal, and/or splined. It should be understood that hub joint 100 may accommodate the above-referenced distal end configurations, as well as other configurations, with little to no configuration changes to the invention.

Hub joint assembly 100 comprises a coupling hub 142 and a clamp ring 144. Coupling hub 142 includes a collar portion 146 that receives distal end 140 of shaft 112, and extends in a direction that is generally parallel with a longitudinal axis 148 of shaft 112. Coupling hub 142 may be formed of high strength steel, but it should be understood that it may be formed of other materials. Collar portion 146 includes a bore having an inner surface 150 that is configured to be the same or substantially similar shape to an outer surface 152 of distal end 140 of shaft 112. For example, if outer surface 152 of distal end 140 of shaft 112 is cylindrical shaped, then inner surface 150 of collar portion 146 may also be cylindrical shaped. As such, inner surface 150 of collar portion 146 is configured to mate and come into contact with outer surface 152 of distal end 140 of shaft 112. Coupling hub 142 further includes an outer surface 178 that may be conically-shaped, wherein a thickness of collar portion 146 at a first distal end 154 would be less than a thickness of collar portion 146 at a second distal end 166 to form tapered outer surface 178. First distal end 154 of collar portion 146 may also include a threaded portion 156 that is adapted to receive matching threads 158 on a shaft plug 160. Shaft plug 160 may include a stop surface 161 that serves to prevent coupling hub 142 from sliding relative to shaft 112 in a direction 162. Threaded portion 156 may also be adapted to engage and resist axial installation forces imposed by a pusher device 163 (FIG. 4), which will be described in more detail below.

Coupling hub 142 further includes a flange portion 164 extends radially outwardly from a second distal end 166 of collar portion 146. For example, flange portion 164 may extend perpendicularly from collar portion 146 a distance that will allow an inward face 168 of flange portion 164 to be positioned adjacent to an outward face 170 of a flange 172 of connector 118. Further, coupling hub 142 may be coupled to connector 118 using at least one fastener 120. It should be understood that a gap 174 may be defined between at least a portion of the interface between flange portion 164 and flange 172 of connector 118, which provides flexibility between these two components.

Hub joint 100 further comprises clamp ring 144 that is configured to receive collar portion 146 of coupling hub 142, whereby clamp ring 144 surrounds at least a portion of collar portion 146 of coupling hub 142. Clamp ring 144 may be formed of high strength steel, but it should be understood that it may be formed of other materials as well. Clamp ring 144 includes a bore having an inner surface 176 that may be conically-shaped to match a conically-shaped outer surface 178 of collar portion 146 of coupling hub 142. As will be described further below, the conical surfaces 176, 178 and the relative position of coupling hub 142 relative to clamp ring 144 will cause clamp ring 144 to impose an inwardly directed radial squeeze force 180 on outer surface 178 of collar portion 146, which in turn drives inner surface 150 of collar portion 146 into high pressure contact with distal end 140 of shaft 112. The taper in outer surface 178 of collar portion 146 may be provided, for example, by configuring collar portion 146 so that a width at first distal end 154 is smaller than a width at second distal end 166. It should be understood that the diameter of outer surface 178 of collar portion 146 may be enlarged by an amount equivalent to the design interference. In one aspect, a protective anti-adhesion coating may be provided on at least a portion of inner surface 176 to provide for increased capacity of hub joint assembly 100 by facilitating higher contact pressures between clamp ring 144 and coupling hub 142. Higher contact pressure translates to higher torque capacity. For example, the protective anti-adhesion coating may be a chemical conversion coating formed of a material, such as, but not limited to, manganese phosphate.

Clamp ring 144 further includes at least one hydraulic passage 182 defined therein that extends from an outer surface 184, through the width of clamp ring 144, to inner surface 176. Hydraulic passage 182 is configured to allow a hydraulic fluid to be introduced at the interface between inner surface 176 of clamp ring 144 and outer surface 178 of collar portion 146 to facilitate the movement between these components when hub joint assembly 100 is being installed. In addition, one or more oil distribution grooves 183a, 183b may be formed in at least one of inner surface 176 of clamp ring 144 and outer surface 178 of collar portion 146 to facilitate distribution of the hydraulic fluid across the interface between inner surface 176 of clamp ring 144 and outer surface 178 of collar portion 146. Further, one or more seal grooves (not shown) may be formed in at least one of inner surface 176 of clamp ring 144 and outer surface 178 of collar portion 146, and used in conjunction with a gasket to help prevent the hydraulic fluid from escaping the tapered interface. Outer surface 184 of clamp ring 144 may be cylindrical shaped, and configured to fit within the confines of connector 118.

Having described the components of hub joint assembly 100, the assembly and operation of this device will now be described with reference to FIGS. 3 and 4. The assembler may first clean debris and coatings off of outer surface 152 of shaft 112 and inner surface 150 of coupling hub 142. Coupling hub 142 is then slid onto shaft 112 to set a final axial position of coupling hub 142 relative to shaft 112. If the outer surface 152 of shaft 112 and inner surface 150 of coupling hub 142 include matching conical surfaces, then coupling hub 142 is slid onto shaft 112 until the surfaces 150, 152 meet. This would take up all radial clearance of the parts and establish the final axial position of coupling hub 142 relative to shaft 112. The surfaces 176, 178 of coupling hub 142 and clamp ring 144 may then be cleaned and slid together to a stop to establish a zero interference point, which is identified as a first relative position between collar portion 146 of coupling hub 142 and clamp ring 144.

Figure 4:
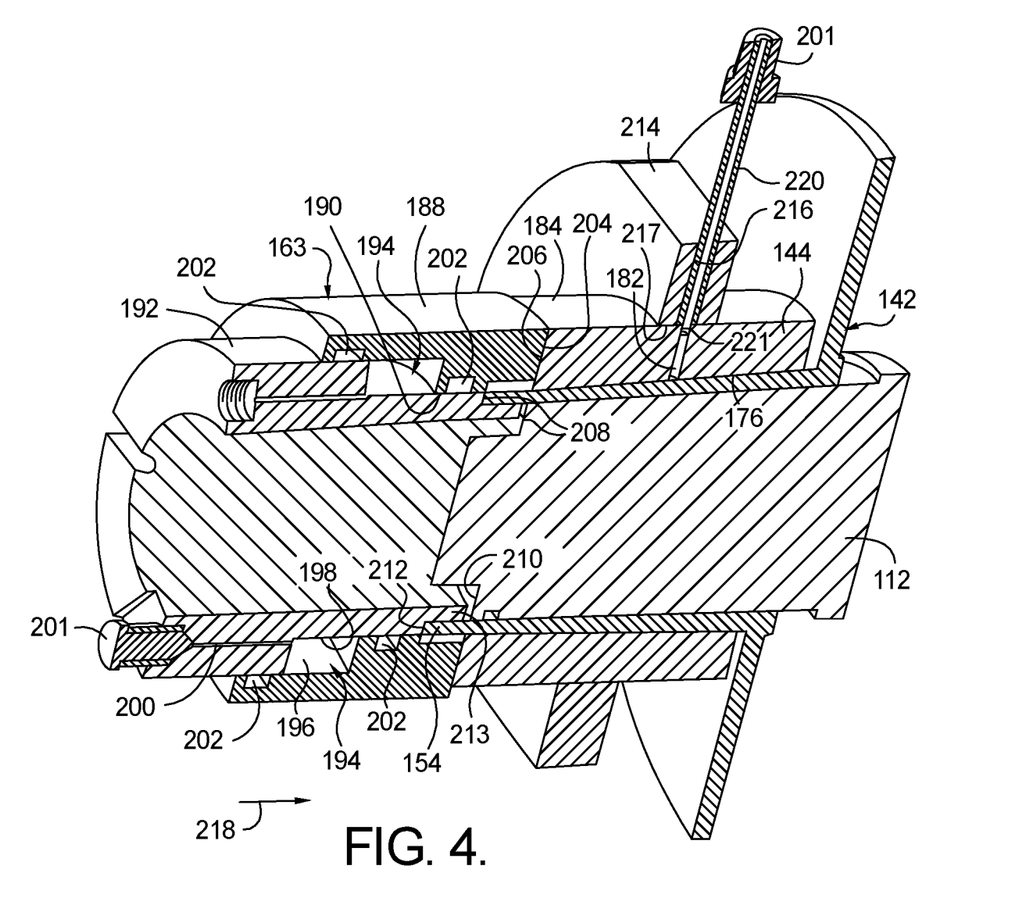
FIG. 4 is a cross-sectional view showing the hub joint shown in FIG. 3 with the connector and shaft plug removed, and having a pusher device connected thereto.

With reference to FIG. 4, pusher device 163 is then used to place clamp ring 144 in a second relative position to coupling hub 142 to frictionally connect hub joint assembly 100 to shaft 112 at a desired or predetermined interference pressure. It should be understood that the second relative position may be a predetermined position. Pusher device 163 includes a cylinder 188 having a bore 190 defined therein, and a piston 192 positioned within bore 190. Cylinder 188 and piston 192 are configured to be slidably coupled with one another. Further, a pressure chamber 194 is defined between an inner surface 196 of cylinder and an outer surface 198 of piston 188. A hydraulic passage 200 may be defined in piston 192 and allow a hydraulic fluid to be inputted into pressure chamber 194 using a hydraulic pressure supply 201 (FIG. 5) to move cylinder 188 and piston 192 relative to one another. Pusher device 163 may further include one or more seals 202 that operate to retain the hydraulic fluid in pressure chamber 194.

Figure 5:
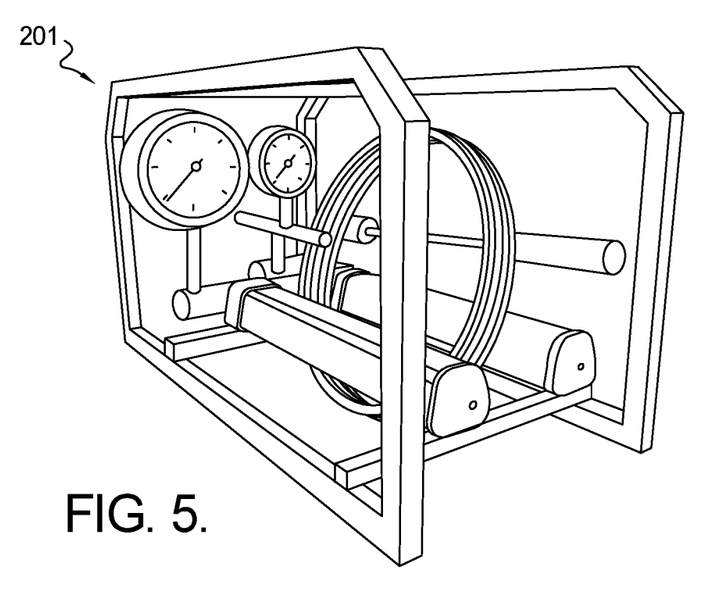
FIG. 5 is a perspective view of a hydraulic pressure supply that may be used with the arrangement shown in FIG. 4.

In order to place clamp ring 144 in the second relative position to coupling hub 142 to frictionally connect hub joint assembly 100 to shaft 112 at the desired interference pressure, pusher device 163 is positioned so that an end surface 204 of cylinder 188 is positioned against an end surface 206 of clamp ring, and an end surface 208 of piston 192 is positioned against ends surfaces 210, 212 of shaft 112 and collar portion 146, respectively. In addition, first distal end 154 of collar portion 146 may be threadably connect to a distal end 213 of piston 192 to prevent movement of coupling hub 142 relative to piston 192. Further, a dilation pressure assembly 214 including a hydraulic passage 216 may be used in instances where hub joint assembly 100 is being used in association with a shaft 112 having an outer diameter of approximately three inches or less where there is not enough material in clamp ring 144 to accommodate a traditional hydraulic port. Dilation pressure assembly 214 may be positioned so that it surrounds at least a portion of clamp ring 144 and hydraulic passages 182, 216 are in alignment. For example, dilation pressure assembly 214 may be ring-shaped and include an inner surface 217 defining an aperture that is configured for receiving clamp ring 144. On one aspect, the entire inner surface 217, or a substantial portion thereof, may be in contact with outer surface 184 of clamp ring 144. The hydraulic pressure supply 201 may be connected to pressure port 200, and hydraulic passage 216 (via a pressure input tube 220), so that hydraulic fluid may be independently inputted into hydraulic passage 200 and hydraulic passages 182, 216, respectively. For example, hydraulic pressure supply 201 may include a first (medium) pressure pump attached to hydraulic passage 200, and a second (high) pump attached to hydraulic passages 216, 182.

At this point, hydraulic fluid may be introduced in an independent, alternating manner between hydraulic passage 200 and hydraulic passages 182, 216 to incrementally move clamp ring 144 from the first relative position at the zero interference point to the second relative position so that collar portion 146 of coupling hub 142 is frictionally coupled with shaft 112. For example, hydraulic fluid is first introduced through hydraulic passages 216, 182 and into the interface between outer surface 178 of collar portion 146 and inner surface 176 of clamp ring 144. This provides for dilation at the interface between outer surface 178 of collar portion 146 and inner surface 176 of clamp ring 144. Hydraulic fluid is then introduced though hydraulic passage 200 and into pressure chamber 194. The pressure within chamber 194 causes cylinder 188 and piston 192 to separate from one another, whereby cylinder 188 is moved in a direction 218. The contact between the ends surfaces 204, 206 of cylinder 188 and clamp ring 144 causes cylinder 188 to move clamp ring 144 an incremental distance in direction 218. The presence of the hydraulic fluid at the interface between outer surface 178 of collar portion 146 and inner surface 176 of clamp ring 144 facilitates the movement of clamp ring 144 up the incline of the taper on outer surface 178 of collar portion 146. As clamp ring 144 moves in direction 218 relative to collar portion 146, inwardly directed radial force 180 is generated which causes collar portion 146 to be squeezed into outer surface 152 of shaft 112. This squeeze creates an interference pressure between collar portion 146 and shaft 112 and thus the frictional connectivity therebetween.

A current position of the clamp ring 144 relative to the collar portion 146 of coupling hub is then measured relative to the first relative position, or otherwise identified, to determine if the current position is the second relative position that will result in the desired interference pressure between collar portion 146 and clamp ring 144. If the current position is not the second relative position, then the above-referenced process repeats in a step-wise manner until clamp ring 144 reaches the second relative position, and therefore the desired interference pressure between collect portion 146 and shaft 112 is reached. For example, hub joint assembly 100 may create an interference pressure of approximately 0.004-0.005 in/(inch of outer diameter of hub). Once the second relative position is reached, the hydraulic pressure from hydraulic pressure supply 201 is released from the interface between outer surface 178 of collar portion 146 and inner surface 176 of clamp ring 144, and then released from pressure chamber 194. The mating outer surface 178 of collar portion 146 and inner surface 176 of clamp ring 144 thereafter operate as "locking" tapers which naturally prevent sliding and releasing of contact pressures at the interfaces between shaft 112, coupling hub 142 and clamp ring 144. Thereafter, hydraulic pressure supply 201 is disconnected from dilation pressure assembly 214 and piston 192, and distal end 213 of piston 192 is disconnected from first distal end 154 of collar portion 146. Dilation pressure assembly 214 is also removed from clamp ring 144. Shaft plug 160 may then be attached to first distal end 154 of collar portion 146 so that end surface 212 of collar portion 146 is in contact with shaft plug 160 to retain coupling hub 142 in the second relative position. Connector 118 may then be attached to flange portion 164 using one or more fasteners 120, such that when shaft 112 is rotating, the frictional connection between shaft 112 causes coupling hub 142 to rotate along with shaft 112. This rotation is then translated through flange portion 164 and connector 118. Connector 118 may then be attached to additional connectors and/or another hub joint assembly that is frictionally connected to a corresponding shaft in the same manner that has been described herein to transfer rotational movement of shaft 112 to the associated shaft.

Numerous benefits and advantages are provided by the hub joint assembly described herein relative to the existing art. One benefit of the present hub joint assembly is that the coupling hub is loaded in compression as opposed to tension. This benefits the coupling hub because it no longer has to bear the high tensile stress required from an outer member of an interference pair. This allows the strength of the coupling hub material to be utilized for more useful power transmission functions. Further, a hydraulic hub in the prior art must grow radially a significant amount to generate the needed squeeze force on the shaft. This strains the material of the hub causing it to grow radially and circumferentially by a significant amount, usually about 90% of the design interference at its outer diameter. This growth strains connections with the flex elements causing them to bear additional stress. Accommodating such strain also affects the hub dimensionally in undesirable ways, potentially causing dimensional instability. In addition, variations of hub installation field practice cause additional variability in the interference level and thus stress and strain around connections which effects overall coupling durability. The hub joint assembly in accordance with the present invention does not suffer from this difficulty because the coupling hub is pressed radially against a radially stiff shaft which yields very low radial strain, associated stress and deflection.

Moreover, when the hub joint assembly of the present invention is installed and removed, high pressure sliding occurs between the clamp ring and the coupling hub, as opposed to the hub and the shaft in the existing art. This is a benefit of the present invention because sliding damage may occasionally occur in the field. The present invention provides a benefit of robustness by preventing sliding damage to the shaft surface. It is preferred to protect the shaft because the shaft is an expensive component and difficult to repair. In the present invention, sliding only occurs between the clamp ring and coupling hub thereby protecting the shaft from damage.

Unlike an existing hydraulically fit hub which must connect to a coupling flex element, a connector, a connecting machine or other, the outer surface of the clamp ring in the present invention does not have to interface with any members other than the coupling hub during operation. On existing hubs, these connections are often configured as a radial flange with bolt circle. Such features placed on an outer surface of the hub yield a non-uniform outer profile (FIG. 1), resulting in significant pressure variations along the hub/shaft interface. This pressure variation makes for local high pressure regions at the interface which, when slid at installation, lead to damage of the hub and shaft surfaces. The clamp ring in the present invention has a uniform outer surface. This uniformity removes pressure concentration allowing for greater nominal interference levels to be designed, without local high pressure regions, typically 0.004-0.005 in/(inch of outer diameter of hub), yielding a greater power density of the hub joint assembly.

Further, an existing low moment coupling connects the shaft to the flex element at the inboard end of the hub, as seen in FIG. 1. One consequence of this is that the connector must extend over any features that make up the hub assembly. Existing shrink disc clamped connections require a large outer diameter to accommodate the connective internal components of the shrink disc forcing the connector to have an unpractically large outer diameter. The hub joint assembly of the present invention utilizes a low profile clamp ring outer diameter which better matches the outer diameter of a traditional hydraulic hub. This makes the hub joint assembly of the present invention better suited to fit within traditional low moment coupling designs.

The present invention also provides an improvement to the hydraulic pressure connection between the dilation pressure assembly 214 and the clamp ring 144. As explained with reference to FIG. 4, the application of dilation pressure to clamp ring 144 causes inner surface 176 to expand, which provides added freedom for clamp ring 144 to move up the taper on outer surface 178 of collar portion 146. As inner surface 176 expands during this process, outer surface 184 of clamp ring 144 also expands. Given that the entire, or a substantial portion, of inner surface 217 of dilation pressure assembly 214 is in contact with outer surface 184 of clamp ring 144, the expansion of outer surface 184 of clamp ring 144 results in an increase in contact pressure between a threaded conical interface 221 between the end of pressure input tube 220 and hydraulic passage 182 to a damaging level. To address this issue, there is provided an alternative dilation pressure assembly that is radially less stiff compared to dilation pressure assembly 214 so that the contact pressure is less affected at the joint as the dilation pressure is increased and clamp ring 144 expands. There are a number of ways to make dilation pressure assembly radially less stiff, such as, for example, by removing material to reduce its cross-section and bending stiffness.

Figure 6:
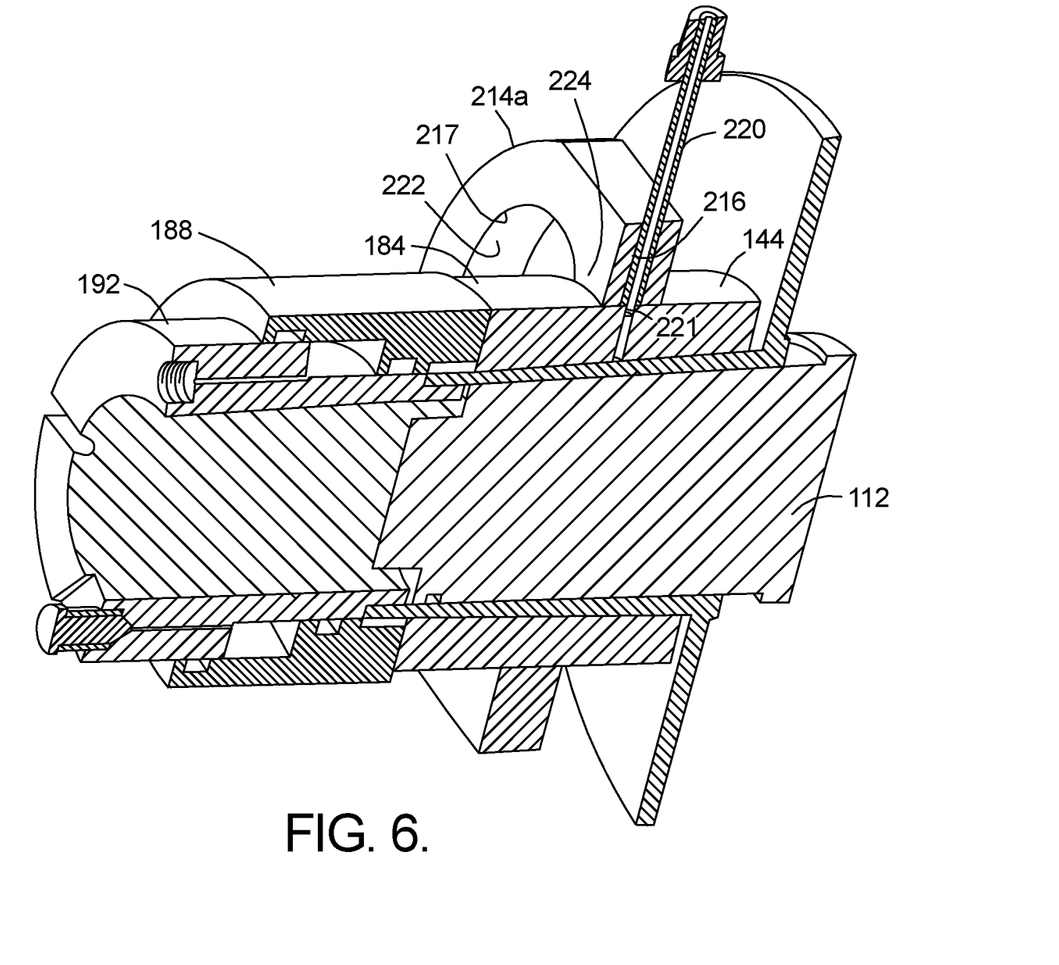
FIG. 6 is a perspective view similar to FIG. 5 including an alternative dilation pressure assembly.
Figure 7:
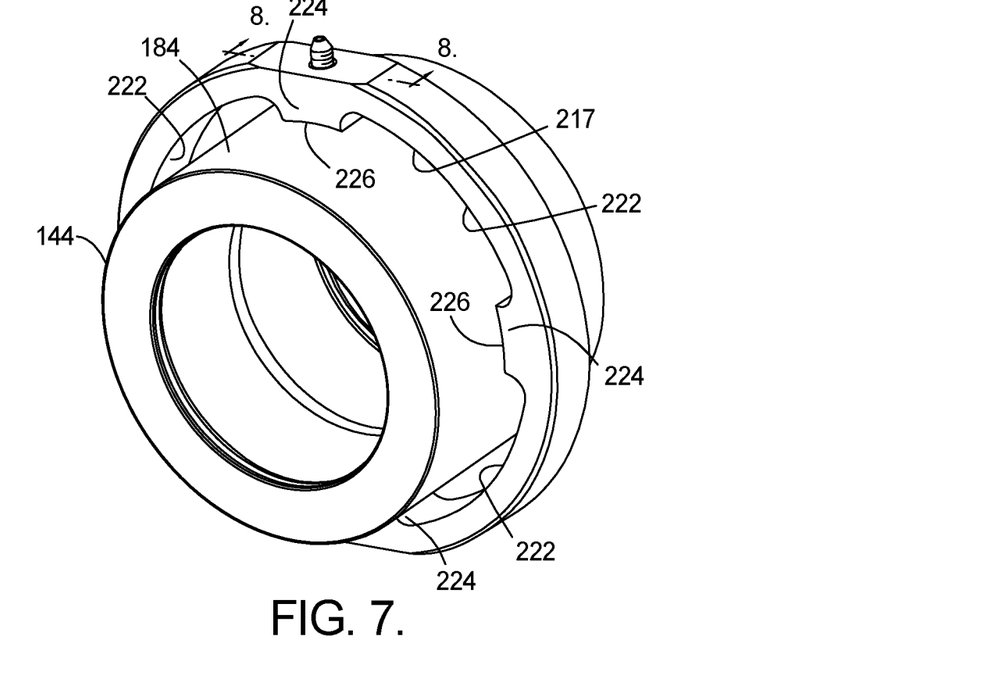
FIG. 7 is a perspective view showing the alternative dilation pressure assembly positioned on a clamp ring.
Figure 8:
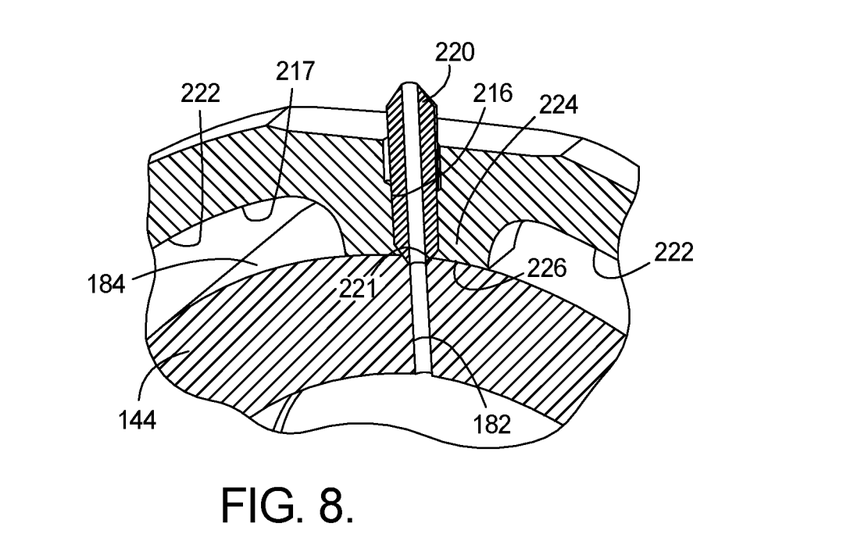
FIG. 8 is a partial cross-sectional view taken along line 8-8 in FIG. 7.

For example, as best seen in FIGS. 6-8, an alternative dilation pressure assembly 214a is provided. As was described with respect to FIG. 4, dilation pressure assembly 214a may be used to incrementally place clamp ring 144 in the second relative position to coupling hub 142 to frictionally connect hub joint assembly 100 to shaft 112 at the desired interference pressure. In one example, the radial stiffness in dilation pressure assembly 214a may be reduced by providing at least one recessed cut-out portion 222 defined in inner surface 217, so that inner surface 217 is not in contact with outer surface 184 of clamp ring 144 in the region of the cut-out portion 222. As best seen in FIGS. 7 and 8, dilation pressure assembly 214a may include, for example, four cut-out portions 222 (only three cut-outs are shown in FIG. 7), which in turn define a corresponding number of extension members 224 that extend radially inwardly toward clamp ring 144. Each of the extension members 224 may be spaced an equal distance apart from one another. An inner surface 226 of each extension member 224 may be configured to contact outer surface 184 of clamp ring 144. One of extension members 224 includes hydraulic passage 216 that is configured to receive pressure input tube 220 and align with hydraulic passage 182 in clamp ring 144 to allow hydraulic fluid to be provided between the interface between outer surface 178 of collar portion 146 and inner surface 176 of clamp ring 144 via threaded interface 221. The inclusion of cut-out portions 222 allow dilation pressure assembly 214a to expand only in the location of extension members 224, where the rest of the dilation pressure assembly 214a bows inward toward outer surface 184 of clamp ring 144. This configuration reduces the contact pressure at the interface between pressure input tube 220 and hydraulic passage 182.

From the foregoing, it will be seen that this invention is one well adapted to attain all the ends and objects hereinabove set forth together with other advantages which are obvious and which are inherent to the method and apparatus. It will be understood that certain features and sub-combinations are of utility and may be employed without reference to other features and sub-combinations. This aspect is contemplated by and is within the scope of the claims. Since many possible embodiments of the invention may be made without departing from the scope thereof, it is also to be understood that all matters herein set forth or shown in the accompanying drawings are to be interpreted as illustrative and not limiting.

The constructions described above and illustrated in the drawings are presented by way of example only and are not intended to limit the concepts and principles of the present invention. As used herein, the terms "having" and/or "including" and other terms of inclusion are terms indicative of inclusion rather than requirement.

While the invention has been described with reference to preferred embodiments, it will be understood by those skilled in the art that various changes may be made and equivalents may be substituted for elements thereof to adapt to particular situations without departing from the scope of the invention. Therefore, it is intended that the invention not be limited to the particular embodiments disclosed as the best mode contemplated for carrying out this invention, but that the invention will include all embodiments falling within the scope and spirit of the appended claims.

What is claimed is:

1. A hub joint assembly for frictionally connecting a shaft to a connector, the hub joint assembly comprising:
    a coupling hub including a collar portion and a flange portion, wherein the collar portion includes a bore having an inner surface that is configured to be positioned adjacent to an outer surface of the shaft, wherein the collar portion further includes an outer surface that is conical, and wherein the flange portion extends from the collar portion to a terminal end and is configured to be coupled with the connector; and
    a clamp ring including a bore having an inner surface, wherein the inner surface is conical and configured to mate with the outer surface of the coupling hub, wherein the clamp ring further includes an outer surface, wherein a passage is defined in the clamp ring, and wherein the passage extends from the outer surface of the clamp ring to the inner surface of the clamp ring, and wherein the terminal end of the flange portion of the coupling hub extends beyond the outer surface of the clamp ring.

2. A hub joint assembly in accordance with claim 1, wherein the flange portion extends perpendicularly from the collar portion.

3. A hub joint assembly in accordance with claim 1, wherein the flange portion is configured to be fixedly coupled with the connector.

4. A hub joint assembly in accordance with claim 1, wherein the collar portion includes a first distal end and a second distal end.

5. A hub joint assembly in accordance with claim 4, wherein the flange portion extends radially from the second distal end.

6. A hub joint assembly in accordance with claim 5, wherein the collar portion includes a first thickness at the first distal end, wherein the collar portion includes a second thickness at the second distal end, and wherein the second thickness is greater than the first thickness.

7. A hub joint assembly in accordance with claim 5, wherein the inner surface of the first distal end of the coupling hub is threaded.

8. A hub joint assembly in accordance with claim 7, further comprising a shaft plug threadably coupled with the first distal end.

9. A hub joint assembly in accordance with claim 1, wherein the inner surface of the collar portion is cylindrical.

10. A hub joint assembly in accordance with claim 1, wherein the outer surface of the clamp ring is configured to be positioned within a bore formed in the connector.

11. A hub joint assembly in accordance with claim 1, further comprising an anti-adhesion coating disposed on the inner surface of the clamp ring.

12. A hub joint assembly in accordance with claim 11, wherein the anti-adhesion coating is a chemical conversion coating.

13. A hub joint assembly in accordance with claim 12, wherein the conversion coating is formed of manganese phosphate.

14. A hub joint assembly in accordance with claim 1, wherein at least one of the inner surface of the clamp ring and the outer surface of the coupling hub has one or more distribution grooves formed therein.

15. A hub joint assembly in accordance with claim 1, wherein the coupling hub is configured to be positioned on only a single shaft.

16. A hub joint assembly for frictionally connecting to a shaft of a first device, the hub joint assembly comprising:
    a coupling hub including a collar portion and a flange portion, wherein the collar portion includes a bore having an inner surface that is configured to be positioned adjacent to an outer surface of the shaft, wherein the collar portion further includes an outer surface that is conical, and wherein the flange portion extends from the collar portion to a terminal end;
    a clamp ring including a bore having an inner surface, wherein the inner surface is conical and configured to mate with the outer surface of the coupling hub, wherein the clamp ring further includes an outer surface, wherein a passage is defined in the clamp ring, and wherein the passage extends from the outer surface of the clamp ring to the inner surface of the clamp ring, and wherein the terminal end of the flange portion of the coupling hub extends beyond the outer surface of the clamp ring; and
    a connector having a first end, a second end and a side wall extending between the first and second ends, wherein the first end is secured to the flange portion of the coupling hub such that an open space is defined between the side wall of the connector and the outer surface of the clamp ring.

17. A hub joint assembly in accordance with claim 16, wherein the inner surface of the collar portion is cylindrical and configured to mount to a cylindrical outer surface of the shaft.

18. A hub joint assembly in accordance with claim 16, wherein the second end of the connector is configured to connect to a second device, and wherein the shaft of the first device drives the second device.

19. A hub joint assembly in accordance with claim 16, wherein the flange portion of the coupling hub is flexible.

20. A hub joint assembly in accordance with claim 19, wherein a gap is defined between the flange portion of the coupling hub and the first end of the connector.

21. A hub joint assembly in accordance with claim 16, wherein the connector is removably secured to the coupling hub, and wherein the coupling hub and clamp ring are frictionally connected to the shaft.

22. A hub joint assembly in accordance with claim 16, wherein the clamp ring is configured to translate linearly along a longitudinal axis of the shaft during clamping activation of the coupling hub and the clamp ring, and wherein the coupling hub is configured to remain stationary on the shaft during clamping activation of the coupling hub and the clamp ring.

* * * * *